United States Patent [19]

Morgan et al.

[11] Patent Number: 5,523,269
[45] Date of Patent: Jun. 4, 1996

[54] PRODUCTION OF CARBIDES AND NITRIDES

[75] Inventors: David L. Morgan; Vladimir Cukan, both of Transvaal, South Africa

[73] Assignee: Enerkom (Proprietary) Limited, Transvaal, South Africa

[21] Appl. No.: 305,853

[22] Filed: Sep. 14, 1994

Related U.S. Application Data

[63] Continuation of Ser. No. 106,641, Aug. 16, 1993, abandoned.

[30] Foreign Application Priority Data

Aug. 17, 1992 [ZA] South Africa .............................. 92/6177

[51] Int. Cl.$^6$ ...................................................... C01B 31/30
[52] U.S. Cl. ............................. 501/93; 423/439; 423/440
[58] Field of Search ................................... 423/439, 440, 423/345, 344, 409, 411, 412; 501/93

[56] References Cited

U.S. PATENT DOCUMENTS

| | | | |
|---|---|---|---|
| 4,353,792 | 10/1982 | Schneider et al. | 208/263 |
| 4,396,587 | 8/1983 | Yamaguchi et al. | 423/344 |
| 4,541,833 | 9/1985 | Mueller | 44/563 |
| 4,762,528 | 8/1988 | Reichl | 423/454 |
| 5,017,525 | 5/1991 | Birchall et al. | 423/345 |

FOREIGN PATENT DOCUMENTS

| | | | |
|---|---|---|---|
| 1367763 | 9/1974 | United Kingdom | 423/440 |

OTHER PUBLICATIONS

Materials Science & Technology, L. T. Kozma, "Silicon Carbide Defies Extreme Heat And Corrosion", pp. 37, 39, 41 (no date).

Journal of Materials Science Letters, vol. 8, 1989, pp. 944–946, Yoshiyuki Sugahara, et al., "Carbothermal Reduction Process Of Precursors Derived From Alkoxides For Synthesis Of Boron–Doped SiC Powder" Jan. 1989.

Chemical Abstracts, AN 136995w, vol. 111, "Manufacture Of Silicon Carbide", Roy T. Coyle, et al., Jun. 13, 1989.

Chemical Abstracts, AN 236207p, "Manufacture Of High-Surface-Area Silicon Carbide Ceramics, Suitable For Catalyst Supports, From Alkoxysilane Gels", Joseph R. Fox, et al., vol. 110, Apr. 4, 1989.

*Primary Examiner*—Michael Lewis
*Assistant Examiner*—Stuart L. Hendrickson
*Attorney, Agent, or Firm*—Oblon, Spivak, McClelland, Maier & Neustadt

[57] ABSTRACT

A method of making a compound selected from metal and silicon carbides and nitrides includes the steps of providing a solution of a coal-derived material in a solvent, the coal-derived material having a composition, free of solvent, of 70 to 91 percent by mass of carbon, 2 to 6 percent by mass of hydrogen and 3 to 20 percent by mass of oxygen, and a source of an oxide of silicon or the metal, causing the coal-derived material in solution and the source of the oxide to interact, removing the solvent to form a precursor and heat treating the precursor to produce the compound.

7 Claims, No Drawings

PRODUCTION OF CARBIDES AND NITRIDES

This application is a continuation of application Ser. No. 08/106,641, filed on Aug. 16, 1993, now abandoned.

BACKGROUND OF THE INVENTION

This invention relates to a method of making carbides and nitrides, particularly silicon and metal carbides.

Silicon carbide is a material with high hardness, wear and corrosion resistance, and chemical stability which makes it an excellent material for a wide range of applications. It can, for example, be used in particulate or bonded form as an abrasive or a ceramic.

The production of very fine metal carbides is particularly desirable to produce dense ceramics.

Silicon carbide is produced by reducing silica (silicon dioxide) in the presence of carbon. Normally a stoichiometric excess of carbon is used. One known such method is to heat silica in the presence of coal or coke resulting in a large silicon carbide mass being produced which has to be crushed and milled to an appropriate particle size. This is expensive when fine material is required.

Intimate mixing between the silica and the carbon increases the reactivity and this intimate mixing can be achieved by using a sol-gel process. This process may, for example, involve preparing a precursor such as a colloidal silica-pitch/sucrose system or by the hydrolysis of a methyltrimethoxysilane-phenolic resin/sucrose system. The precursor is pyrolysed in argon producing a sinterable silicon carbide powder.

SUMMARY OF THE INVENTION

According to the present invention, a method of making a compound selected from metal and silicon carbides and nitrides includes the steps of providing a solution of a coal-derived material in a solvent, the coal-derived material having a composition, free of solvent, of 70 to 91 percent by mass of carbon, 2 to 6 percent by mass of hydrogen and 3 to 20 percent by mass of oxygen, and a source of an oxide of silicon or the metal, causing the coal-derived material in solution and the source of the oxide to interact, removing the solvent to form a precursor and heat treating the precursor to produce the compound.

DESCRIPTION OF EMBODIMENTS

The method of the invention provides an efficient means of producing a metal or silicon carbide or nitride, using a coal sourced material as the carbon source. This coal sourced material is inexpensive and provides carbon for reducing the oxide in a form which enables the oxide to make intimate contact therewith thus allowing more ready reaction of the carbon with the oxide.

The metal carbides and nitrides which can be produced by the method of the invention may, for example, be transition metal carbides or nitrides such as tungsten, titanium, tantalum, vanadium and molybdenum carbides and nitrides. The invention may be used for producing an intimate mixture of two or more such carbides or two or more such nitrides.

The coal sourced material is in the form of a solution containing a coal-derived material. This solution may be produced by the solubilisation method described in U.S. Pat. No. 5,120,430. The method comprises solubilising organic material in a coal by contacting the coal with a medium comprising an organic solvent and a strong base or a phenoxide reactively associated with the organic solvent. The medium may further contain a phase transfer catalyst such as a crown ether. The solvent is a dipolar aprotic solvent such as a dimethylformamide. The base preferably has a pKa value of its conjugate acid in the range 14 to 30. An example of such a base is a metal hydroxide such as sodium or potassium hydroxide.

The starting material may also be produced by the method disclosed in South African Patent No. 91/8774. This method involves treating coal with a base or a phenoxide followed by contacting the treated coal with an organic solvent. The base is typically a strong base such as one having a pKa value of its conjugate acid in the range 14 to 30. The solvent may be pyridine or a dipolar aprotic solvent.

The solvent for the coal-derived material is preferably a dipolar aprotic solvent. Examples of suitable dipolar aprotic solvents in which the coal-derived material is soluble are dimethylformamide, dimethylacetamide, tetramethylurea, dimethyltetrahydropyrimidinone, dimethylimidazolidinone, N-methylpyrrolidone and dimethylsulphoxide. The preferred dipolar aprotic solvent is dimethylformamide.

The viscosity of the solution of coal-derived material may be sufficiently low to allow it to be filtered to remove particles down to micron and sub-micron dimensions thus giving a pure source of carbon. More viscous solutions, even to the point of paste consistency, may also be used.

The method of the invention has as a starting material not only the coal-derived material solution, but also a source of an oxide of silicon or the metal. This source may take the form of the oxide itself, or a material which can be converted to an oxide such as an ester of silicic or polysilicic acid or a silicate. Whatever the source of the oxide, the coal-derived material in solution and the source of the oxide will be caused to interact and the solvent removed to form a precursor. It is this precursor which is heat treated to produce the nitride or carbide. Thus, from a coal source, a precursor is produced from intimate contact between the coal-derived material and the source of the oxide resulting in efficient and effective carbide or nitride production.

In one form of the invention, the source of the oxide is a particulate oxide which is added to the coal-derived material solution. The particulate oxide may be fine and/or have a large surface area. In this form of the invention, the coal-derived material in solution is mixed with the oxide. In this way there is interaction between the coal-derived material and the oxide. The solvent is then removed resulting in the precursor being formed. The coal-derived material may be caused to precipitate by adding water to the solution. The precursor will generally be dried prior to heat treatment.

An example of this form of the invention is as follows. A finely particulate form of the oxide, such as precipitated silica, is mixed with a coal-derived material solution. Thereafter, water, typically 75 to 90 percent by mass of the coal-derived material solution, is added with stirring to precipitate the coal-derived material. Stirring is preferably continued in a mixer such as a high-shear mixer until an homogenous slurry-like consistency is achieved. The slurry is dried in a drying oven. This results in a powdered mixture which may be ground to a finer particle size. The mixture consists of an intimate mixture of coal-derived material and the oxide and is the precursor which is heat treated.

In a second form of the invention, the source of oxide is in colloidal form and this source interacts with the coal-derived material in solution to form a gel. The solvent is removed to form the precursor.

The colloidal form of the source of oxide will typically be produced by hydrolysing a suitable ester. For example, an ester of silicic or polysilicic acid may be hydrolysed to form colloidal silica. Examples of suitable esters of polysilicic and silicic acid are alkyl esters such as ethyl esters. A further example is the hydrolysis of titanium alkoxide to form colloidal titanium oxide. The hydrolysis can take place before contact is made with the coal-derived material solution, or hydrolysis can take place after such contact.

The coal-derived material solution/colloidal source, prior to gelling, may be shaped to a desired form, for example, by casting in a mould, allowed to gel, the solvent removed and the resulting precursor heat treated while maintaining the form. This will then result in a carbide or nitride being produced in a desired shape. This is an advantage particularly with hard carbides and nitrides which are expensive to shape. Alternatively, the gel can be fragmented or broken down and heat treated in this form.

An example of this form of the invention is as follows. An ester of silicic acid such as tetraethyl orthosilicate is hydrolysed by adding it to a solvent such as dimethylformamide to which is added water and a small quantity of an acid such as hydrochloric acid which acts as a catalyst for the hydrolysis. The mixture is stirred until hydrolysis of the ester is complete and the mixture becomes clear. The hydrolysed ester, i.e. colloidal silica, is then mixed with a coal-derived material solution. Stirring is continued until homogeneity is achieved. The mixture is left to gel. The gel may be broken up and washed with water to remove organic solvent to form the precursor which may then be dried.

In a third form of the invention, the source of oxide is in solution and is added to the coal-derived material solution to cause a co-precipitate of the coal-derived material and an oxide precursor to form. The oxide precursor will convert to the oxide on heat treatment. An example of a source of oxide in solution is an aqueous silicate solution which causes silica to precipitate on acidification. A further example is an ammonium tungstate solution which, on the addition of an organic solvent, causes a precursor of tungsten oxide to precipitate. Yet a further example is a metal salt solution such as a vanadyl chloride solution which, on the addition of an alkali such as sodium hydroxide, causes a vanadate oxide precursor to precipitate.

The invention has particular application to the production of silicon and metal carbides and mixtures thereof. To produce these carbides, the precursor will be heat treated at a temperature of at least 500° C. in an inert atmosphere. The inert atmosphere may be any inert gas and is typically argon. The temperature of heat treatment will vary according to the nature of the metal. Generally, the temperature of heat treatment will be in the range 600° C. to 2200° C.

Where it is desired to produce a nitride, the heat treatment will take place in a nitrogen atmosphere. The temperature of the heat treatment will vary according to the nature of the metal and will again generally be in the range 600° C. to 2200° C.

As mentioned above, the solution of coal-derived material is preferably prepared using the method described in U.S. Pat. No. 5,120,430. For example, such a solution may be produced by gently agitating a medium volatile coking coal (7 g) with dimethylformamide (70 ml) in the presence of potassium hydroxide (1,1 g) at room temperature for 24 hours. Using this method, various medium volatile coking coals may be used resulting in organic carbon extractions as set out in Table 1 below:

TABLE 1

| Coals used | A | B | C |
| --- | --- | --- | --- |
| DAF analysis | | | |
| C% | 86,8 | 88,5 | 88,2 |
| H% | 5,2 | 5,2 | 5,0 |
| N% | 1,8 | 2,1 | 2,1 |
| O% | 5,4 | 3,4 | 3,6 |
| % Organic carbon extracted | 79 | 90 | 80 |

DAF = Dry Ash-Free basis.

The invention will now be illustrated by the following examples. In these examples the coal-derived material solutions all had a carbon, hydrogen and oxygen composition essentially as set out for coal B in Table 1 above.

EXAMPLE 1

A coal-derived material solution, 8 percent by mass of coal organic solids, was prepared by stirring 100 g of coal together with 1000 ml dry dimethylformamide (DMF) and 10 g of finely divided sodium hydroxide at 90° C. for 4 hours, under an inert atmosphere.

The slurry of coal-derived material solution and undissolved material was centrifuged, while still hot at 2600 rpm for 30 minutes to remove the undissolved material. The viscosity of the solution was approximately 3 cP at 30° C.

500 g of this solution was well mixed with 27,4 g of precipitated silica having a specific surface area of 180 $m^2$/g. 400 g water was added to precipitate the coal solids. The slurry was well mixed and then dried to remove the water and solvent.

Soluble material was removed by washing and the precursor mixture dried. The mixture was pelletised and heated under flowing argon in a furnace at 10° C./min to 1500° C. and held there for 120 minutes.

The excess carbon was removed by heating in air. A trace of silica was removed by treatment with hydrofluoric acid to give silicon carbide, with an average crystallite size of 205 Å in the form of long needles.

EXAMPLE 2

A colloidal silica solution was prepared by hydrolysing a solution of an ethyl ester of polysilicic acid containing 40 percent by mass of silica. 2215 g of this ester was mixed with 775 g DMF and 150 ml of a 1 percent hydrochloric acid solution until the solution is clear. This solution, cooled to 5° C., and 10200 g of a coal-material-derived solution, as prepared in Example 1, and also cooled to 5° C., were vigorously mixed and allowed to gel over 10 minutes.

The gel was broken up and washed with water to remove DMF and then dried.

The dried precursor was pelletised and heated under flowing argon at 5° C./min to 1300° C. and held there for 90 minutes. Silicon carbide, in the form of fine particles having a crystallite size of 120 Å and a surface area of 22,5 $m^2$/g remained after removal of excess carbon and a trace of unreacted silica.

EXAMPLE 3

A precursor mixture was prepared as in Example 2 and converted to silicon carbide by heating at 15° C./min to 1400° C. in argon and held there for 120 minutes.

Silicon carbide in the form of long needles remained after removal of excess carbon and silica.

EXAMPLE 4

Ethyl polysilicate having a silica content of 40% (47,2 g) was mixed with dimethylformamide (DMF) (47 g) and a 1% solution of hydrogen chloride in water (8,5 g) and allowed to react. This solution was then mixed with a product comprising 8% coal-derived material solution in DMF (200 ml) and allowed to gel. The DMF was removed by washing with water and drying. Heating in an inert atmosphere at a temperature of 1550° C. for 1 hour gave silicon carbide after removal of small amounts unreacted silica and carbon. The surface area (BET) of the silicon carbide was 19 $m^2/g$.

EXAMPLE 5

78,5 g of a sodium silicate solution containing 29 percent by mass silica and 8,8 percent by mass alkali expressed as sodium oxide was blended with 420 g of a coal-derived material solution as prepared in Example 1, using a high-shear mixer. While being blended, 100 ml of a 17 percent hydrochloric acid solution was added to give a precipitate of coal-derived material and silica. The DMF was removed and the precursor powder dried. This precursor powder was heated under argon to 1620° C. for 180 minutes to give, after removal of carbon and silica, a silicon carbide powder having a surface area of 5,8 $m^2/g$.

EXAMPLE 6

Silicon carbide precursor powder was prepared as in Example 5. It was heated under argon to 1435° C. for 1080 minutes, carbon and silica removed, to give a silicon carbide powder having a surface area of 53 $m^2/g$.

EXAMPLE 7

Sodium silicate solution in water (silica content 12% and $Na_2O$ content of 3,6%) nitric acid (33%) and a coal-derived material solution were pumped separately and continuously into a well-stirred reactor at such a rate that the acid just neutralised the alkali content of the sodium silicate solution. The mass ratio of silica to coal-derived solids was 60:48. A co-precipitate formed which was well washed with water to remove sodium salts and solvent. The co-precipitate was dried and heated to 1500° C. for 1 hour in argon when silicon carbide was formed.

EXAMPLE 8

45 g of a coal-derived material solution was well-mixed with 12,1 g of a finely divided tungsten oxide. 50 ml water was added to precipitate the coal-derived material. The powder comprising a mixture of tungsten oxide and coal-derived material was dried and then washed with water to remove soluble salts. The powder was re-dried and heated in an atmosphere of argon at 1800° C. for 60 minutes to give tungsten carbide having a mean crystallite size of 1445 Å.

EXAMPLE 9

60,4 g of a coal-derived material solution was well mixed with 8 g of finely divided titanium oxide. The solvent was evaporated and the mixture heated at 1700° C. in an atmosphere of argon for 60 minutes to give titanium carbide having a mean crystallite size of 400 Å.

We claim:

1. A method of making a compound selected from transition metal carbides and a mixture of carbides, comprising the steps of providing a solution of a coal-derived material in a dipolar, aprotic solvent, the coal-derived material having a composition, free of solvent, of 70 to 91 percent by mass of carbon, 2 to 6 percent by mass of hydrogen and 3 to 20 percent by mass of oxygen, and a source of an oxide of a transition metal or mixtures thereof, causing the coal-derived material in solution and the source of the oxide to interact, removing the solvent to form a precursor and heat treating the precursor to produce the compound.

2. A method according to claim 1 wherein the source of the oxide is a particulate oxide which is added to the coal-derived material solution.

3. A method according to claim 1 wherein the source of oxide is in solution and is added to the coal-derived material solution to form a co-precipitate with the coal-derived material.

4. A method according to claim 1 wherein the precursor is heat treated at a temperature of at least 500° C. in inert atmosphere to produce a carbide.

5. A method according to claim 1 wherein the dipolar, aprotic solvent is selected from dimethylformamide, dimethylacetamide, tetramethylurea, dimethyltetrahydropyrimidinone, dimethylimidazolidinone, N-methylpyrrolidone and dimethylsulphoxide.

6. A method according to claim 1 wherein the dipolar, aprotic solvent is dimethylformamide.

7. A method according to claim 2, wherein water is added after interaction to precipitate the coal-derived material from its solution.

* * * * *